(12) United States Patent
    Liu et al.

(10) Patent No.: US 11,886,492 B2
(45) Date of Patent: Jan. 30, 2024

(54) METHOD OF MATCHING IMAGE AND APPARATUS THEREOF, DEVICE, MEDIUM AND PROGRAM PRODUCT

(71) Applicant: BOE Technology Group Co., Ltd., Beijing (CN)

(72) Inventors: Xiangyang Liu, Beijing (CN); Tong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 606 days.

(21) Appl. No.: 17/056,900

(22) PCT Filed: Apr. 24, 2020

(86) PCT No.: PCT/CN2020/086666
    § 371 (c)(1),
    (2) Date: Nov. 19, 2020

(87) PCT Pub. No.: WO2020/238515
    PCT Pub. Date: Dec. 3, 2020

(65) Prior Publication Data
    US 2021/0174135 A1    Jun. 10, 2021

(30) Foreign Application Priority Data
    May 29, 2019  (CN) .......................... 201910457984.9

(51) Int. Cl.
    *G06K 9/62*        (2022.01)
    *G06F 16/583*      (2019.01)
    (Continued)

(52) U.S. Cl.
    CPC ........ *G06F 16/5838* (2019.01); *G06F 16/532* (2019.01); *G06F 16/55* (2019.01);
    (Continued)

(58) Field of Classification Search
    CPC .... G06F 16/5838; G06F 16/532; G06F 16/55; G06F 18/22; G06F 18/23; G06F 18/2431;
    (Continued)

(56) References Cited

U.S. PATENT DOCUMENTS 9,811,757 B2    11/2017  Sharma
2007/0098266 A1*  5/2007  Chiu ....................... G06F 16/58
                                                   707/E17.026
(Continued)

FOREIGN PATENT DOCUMENTS

CN      103150330 A     6/2013
CN      104008174 A     8/2014
(Continued)

OTHER PUBLICATIONS

Office Action dated Dec. 2, 2020, issued in counterpart CN Application No. 201910457984.9, with English Translation. (15 pages).

*Primary Examiner* — Duy M Dang
(74) *Attorney, Agent, or Firm* — WHDA, LLP

(57) ABSTRACT

Embodiments of the present disclosure provide a method of matching image, an apparatus of matching image, a device, and a computer-readable storage medium. The method includes: acquiring an image to be matched; determining a key point feature similarity between any image in an image library and the image to be matched, and determining a color feature similarity between the any image and the image to be matched; determining a fusion similarity between the any image and the image to be matched according to the key point feature similarity and the color feature similarity; and determining whether an image matching the image to be matched exists in the image library or not according to the fusion similarity between each of at least one image in the image library and the image to be matched.

18 Claims, 7 Drawing Sheets

(51) Int. Cl.
*G06F 16/55* (2019.01)
*G06F 16/532* (2019.01)
*G06V 10/56* (2022.01)
*G06F 18/22* (2023.01)
*G06F 18/23* (2023.01)
*G06F 18/25* (2023.01)
*G06F 18/2431* (2023.01)
*G06V 10/75* (2022.01)
*G06V 10/74* (2022.01)
*G06V 10/762* (2022.01)
*G06V 10/764* (2022.01)
*G06V 10/80* (2022.01)
*G06V 10/46* (2022.01)
*G06V 20/30* (2022.01)

(52) U.S. Cl.
CPC .............. *G06F 18/22* (2023.01); *G06F 18/23* (2023.01); *G06F 18/2431* (2023.01); *G06F 18/253* (2023.01); *G06V 10/462* (2022.01); *G06V 10/56* (2022.01); *G06V 10/757* (2022.01); *G06V 10/758* (2022.01); *G06V 10/761* (2022.01); *G06V 10/762* (2022.01); *G06V 10/764* (2022.01); *G06V 10/806* (2022.01); *G06V 20/30* (2022.01)

(58) Field of Classification Search
CPC ...... G06F 18/253; G06V 10/40; G06V 10/46; G06V 10/462; G06V 10/56; G06V 10/757; G06V 10/758; G06V 10/761; G06V 10/762; G06V 10/764; G06V 10/806; G06V 20/30; G06T 7/90
See application file for complete search history.

(56) References Cited

U.S. PATENT DOCUMENTS

2013/0170716 A1* 7/2013 Lee .................. G06F 16/41
382/113
2014/0099033 A1 4/2014 Natarajan et al.
2018/0349695 A1* 12/2018 Le Henaff .......... G06V 20/80

FOREIGN PATENT DOCUMENTS

| CN | 104504007 A | 4/2015 |
| CN | 106649487 A | 5/2017 |
| CN | 106933861 A | 7/2017 |
| CN | 107392215 A | 11/2017 |
| CN | 108460114 A | 8/2018 |
| CN | 110188217 A | 8/2019 |

* cited by examiner

METHOD OF MATCHING IMAGE AND APPARATUS THEREOF, DEVICE, MEDIUM AND PROGRAM PRODUCT

CROSS-REFERENCE TO RELATED APPLICATION

This present disclosure corresponds to PCT international application PCT/CN2020/086666 and claims priority to Chinese Patent Application No. 201910457984.9, filed on May 29, 2019, which is incorporated herein by reference in its entirety.

TECHNICAL FIELD

The present disclosure relates to a field of computer vision technology, and in particular to a method of matching an image, an apparatus of matching an image, a device, a computer non-transitory readable storage medium, and a program product.

BACKGROUND

In scenarios involving image storage, images from various sources may be stored in an image library. For example, the following two situations may cause a waste of storage space in the image library: 1. a maintainer of the image library adds the same or similar images to the image library multiple times; 2. an image uploaded by the user is the same or similar to the existing image in the image library. Multiple repeated or similar images are used as redundant data in the image library, which will waste a lot of storage space.

SUMMARY

The present disclosure provides a method of matching an image, an apparatus of matching an image, a device, a computer non-transitory readable storage medium, and a program product.

According to an aspect of the present disclosure, there is provided a method of matching image, comprising: acquiring an image to be matched; determining a key point feature similarity between any image in an image library and the image to be matched, and determining a color feature similarity between the any image and the image to be matched; determining a fusion similarity between the any image and the image to be matched according to the key point feature similarity and the color feature similarity; and determining whether an image matching the image to be matched exists in the image library or not according to the fusion similarity between each of at least one image in the image library and the image to be matched.

In an example, the method further comprising: prior to the determining a key point feature similarity between any image in an image library and the image to be matched, extracting key point features of a plurality of sample images in a preset sample library, and the preset sample library comprising the image library; clustering the key point features of the plurality of sample images to obtain a plurality of feature categories; extracting at least one key point feature of the any image; for each key point feature of the any image, classifying the key point feature to determine, from the plurality of feature categories, a feature category to which the key point feature belongs; and determining a key point feature distribution information of the any image according to the feature category to which each of at least one key point feature of the any image belongs.

In an example, the clustering the key point features of the plurality of sample images in the preset sample library includes: clustering the key point features of the plurality of sample images by using a cluster center initialization method based on a hierarchical method.

In an example, the determining a key point feature similarity between the any image and the image to be matched comprises: extracting at least one key point feature of the image to be matched; for each key point feature of the image to be matched, classifying the key point feature to determine, from the plurality of feature categories, a feature category to which the key point feature belongs; determining a key point feature distribution information of the image to be matched according to the feature category to which each of at least one key point feature of the image to be matched belongs; and determining a key point feature similarity between the any image and the image to be matched according to the key point feature distribution information of the any image and the key point feature distribution information of the image to be matched.

In an example, the determining a key point feature similarity between the any image and the image to be matched according to the key point feature distribution information of the any image and the key point feature distribution information of the image to be matched comprises: determining a first number of key point features contained in the any image and the image to be matched and belonging to same feature category according to the key point feature distribution information of the any image and the key point feature distribution information of the image to be matched; and determining a key point feature similarity between the any image and the image to be matched according to the first number.

In an example, the first number is $N_{same}$, the any image comprises a second number $N_n$ key point features, and the image to be matched comprises a third number $N_{check}$ key point features, wherein $N_{same}$, $N_n$, and $N_{check}$ are all integers greater than or equal to 0; the determining a key point feature similarity between the any image and the image to be matched according to the first number comprises: determining a key point feature similarity between the any image and the image to be matched according to a following formula $$P_{sift} : P_{sift} = \frac{N_{same}}{N_{check} + N_n}.$$

In an example, the method further comprising: prior to the determining a key point feature similarity between the any image and the image to be matched, determining a reverse index table according to the key point feature distribution information of each of at least one image in the image library, and the reverse index table indicating a mapping relationship from each of the plurality of feature categories to the at least one image; wherein the determining a first number of key point features contained in the any image and the image to be matched and belonging to same feature category comprises: setting an initial value of the first number to 0; for each key point feature contained in the image to be matched, searching an image that has a mapping relationship with a feature category to which the key point feature belongs in the reverse index table, and when the image having a mapping relationship comprising the any image, adding 1 to the value of the first number; and in response to traverse the key point features contained in the image to be matched, determining the value of the first number.

In an example, the key point feature comprises: a scale invariant feature transform SIFT key point feature.

In an example, the method further comprising: prior to the determining a color feature similarity between the any image and the image to be matched, acquiring a plurality of color categories; calculating a color feature value of each pixel in the any image; determining a color category to which each pixel in the any image belongs from the plurality of color categories according to the color feature value of each pixel in the any image; and determining a color feature of the any image according to the color category to which each of a plurality of pixels in the any image belongs.

In an example, the determining a color feature similarity between the any image and the image to be matched comprises: calculating a color feature value of each pixel in the image to be matched; determining a color category to which each pixel in the image to be matched belongs from the plurality of color categories according to the color feature value of each pixel in the image to be matched; and determining a color feature of the image to be matched according to the color category to which each of the plurality of pixels in the image to be matched belongs.

In an example, the determining a color feature similarity between the any image and the image to be matched further comprises: determining an Euclidean distance between the color feature of the any image and the color feature of the image to be matched; and determining a color feature similarity between the any image and the image to be matched according to the Euclidean distance.

In an example, the calculating a color feature value of each pixel in the any image comprises: for each pixel in the any image, converting a color mode RGB value of each pixel into an HSV value, performing an integer processing on the HSV value, and calculating a color feature value of each pixel in the any image according to integer processed HSV value; and wherein the calculating a color feature value of each pixel in the image to be matched comprises: for each pixel in the image to be matched, converting a color mode RGB value of each pixel into an HSV value, performing an integer processing on the HSV value, and determining a color feature value of each pixel in the image to be matched according to integer processed HSV value.

In an example, the determining a fusion similarity between the any image and the image to be matched according to the key point feature similarity and the color feature similarity comprises: setting a first weight and a second weight, wherein a sum of the first weight and the second weight equals to 1; performing a weighted summation on the key point feature similarity between the any image and the image to be matched and the color feature similarity between the any image and the image to be matched according to the first weight and the second weight to obtain a fusion similarity between the any image and the image to be matched.

In an example, the setting a first weight comprises: determining the first weight α by a following formula:

$$\alpha = \frac{N_{check} - L_1}{L_2 - L_1}$$

wherein $N_{check}$ indicates a number of key point features of the image to be matched, $L_1$ indicates a first threshold number of key point features, and $L_2$ indicates a second threshold number of key point features.

In an example, the determining whether an image matching the image to be matched exists in the image library or not according to the fusion similarity between each of at least one image in the image library and the image to be matched comprises: sorting fusion similarities between each of at least one image in the image library and the image to be matched in descending order to obtain a fusion similarity sequence; using an image for which a fusion similarity greater than a fusion similarity threshold in the fusion similarity sequence as an image matching the image to be matched.

In an example, the method further comprising: when no image matching the image to be matched exists in the image library, the image to be matched may be added in the image library.

According to another aspect of the present disclosure, there is provided an apparatus of matching an image, comprising: a first processing module configured to acquire an image to be matched; a second processing module configured to determine a key point feature similarity between any image in an image library and the image to be matched, and determine a color feature similarity between any image and the image to be matched; a third processing module configured to determine a fusion similarity between the any image and the image to be matched according to the key point feature similarity and the color feature similarity; and a fourth processing module configured to determine whether an image matching the image to be matched exists in the image library or not according to the fusion similarity between each of at least one image in the image library and the image to be matched.

According to another aspect of the present disclosure, there is provided an electronic device, comprising: at least one processor, a memory, and a bus; wherein the bus is configured to connect the processor and the memory. The memory is configured to store operation instructions. The processor is configured to execute the method of matching an image of any one of the foregoing embodiments by invoking operation instructions.

According to another aspect of the present disclosure, there is provided a computer non-transitory readable storage medium having a computer program stored thereon, wherein the computer program is configured to implement the method of matching an image of any one of the foregoing embodiments when executed by a processor.

According to another aspect of the present disclosure, there is provided a computer program product comprising executable instructions that, when executed by a processor, implement the method of matching an image of any one of the foregoing embodiments.

The additional aspects and advantages of the present disclosure will be partly given in the following description, which will become obvious from the following description, or be understood through the practice of the present disclosure.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION OF EMBODIMENTS

Figure 1A:
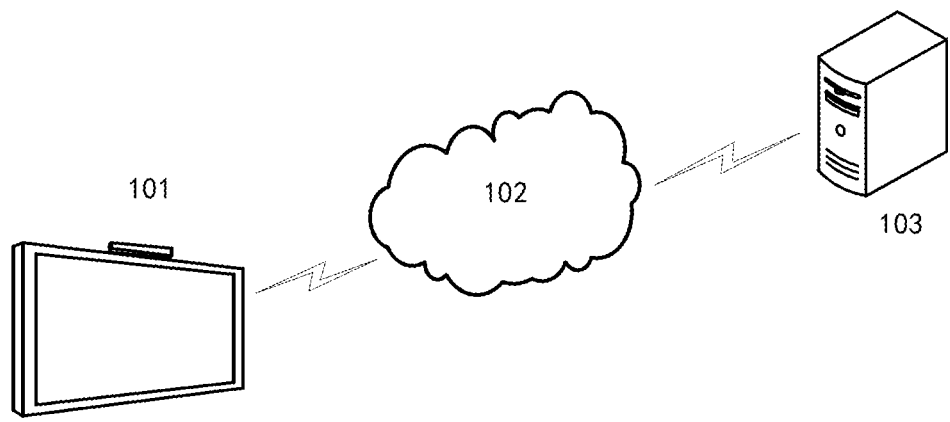
FIGS. 1A and 1B are schematic diagrams of a system architecture to which a method of matching an image and an apparatus of matching an image may be applied provided by an embodiment of the disclosure.

The present disclosure will be described in detail below. Examples of embodiments of the present disclosure are shown in the accompanying drawings, where the same or similar reference numerals indicate the same or similar components or components with the same or similar functions. In addition, if a detailed description of the known technology is unnecessary for the illustrated feature of the present disclosure, it will be omitted. The embodiments described below with reference to the drawings are exemplary, and are only used to explain the present disclosure, and cannot be construed as limiting the present disclosure.

Those skilled in the art may understand that, unless otherwise defined, all terms (including technical terms and scientific terms) used herein have the same meanings as those commonly understood by those of ordinary skill in the art to which this disclosure belongs. It should also be understood that terms such as those defined in a general dictionary should be understood as having a meaning consistent with the meaning in the context of the related art, and unless specifically defined as here, they will not be interpreted in an idealized or overly formal meaning.

Those skilled in the art may understand that, unless specifically stated, the singular forms "a", "an", "said" and "the" used herein may also include plural forms. It should be further understood that the term "comprising" used in the specification of the present disclosure refers to the presence of the described features, integers, steps, operations, elements and/or components, but does not exclude the presence or addition of one or more other features, integers, steps, operations, elements, components, and/or groups thereof. It should be understood that when we refer to an element as being "connected" or "coupled" to another element, it may be directly connected or coupled to the other element, or intervening elements may also be present. In addition, "connected" or "coupled" used herein may include wireless connection or wireless coupling. The term "and/or" as used herein includes all or any unit and all combinations of one or more associated listed items.

In scenarios involving image storage, images from various sources may be stored in an image library. For example, the following two situations will cause a waste of storage space in the image library: 1. a maintainer of the image library adds same or similar images to the image library multiple times; 2. an image uploaded by a user is same as or similar to an existing image in the image library. Multiple same or similar images are used as redundant data in the image library, which will waste a lot of storage space.

For example, digitized paintings, calligraphy works, photos and other images are stored in the image library, and electronic devices are used to display the images in the image library for users to view various paintings, calligraphy works, photos, etc. The image library may be provided on an electronic device side or on a server side. In some cases, the same or similar images are repeatedly added to the image library. As the digitized paintings, calligraphy works, photos and other images occupy a large storage space, a lot of storage space is wasted.

First, a system architecture to which the method of matching an image and the apparatus of matching an image in the embodiments of the present disclosure may be applied is exemplarily introduced.

As shown in FIG. 1A, a system architecture 100 according to an embodiment of the present disclosure may include an electronic device 101, a network 102, and a server 103. The network 102 is a medium used to provide a communication link between the electronic device 101 and the server 105. The electronic device 101 may be, for example, a smart phone, a tablet computer, a smart TV, a portable computer, a desktop computer, etc., which is not limited here. The server 103 may provide various background services for the electronic device 101. For example, receiving a request message from the electronic device 101, responding to the received request message such as analysis and processing, and feeding back the corresponding response result to the electronic device 101.

The method of matching an image according to the embodiment of the present disclosure may be implemented in the electronic device 101, and accordingly, the apparatus of matching an image according to the embodiment of the present disclosure may be provided in the electronic device 101. Alternatively, the method of matching an image according to the embodiment of the present disclosure may also be implemented in the server 103, and accordingly, the apparatus of matching an image according to the embodiment of the present disclosure may also be provided in the server 103.

Figure 1B:
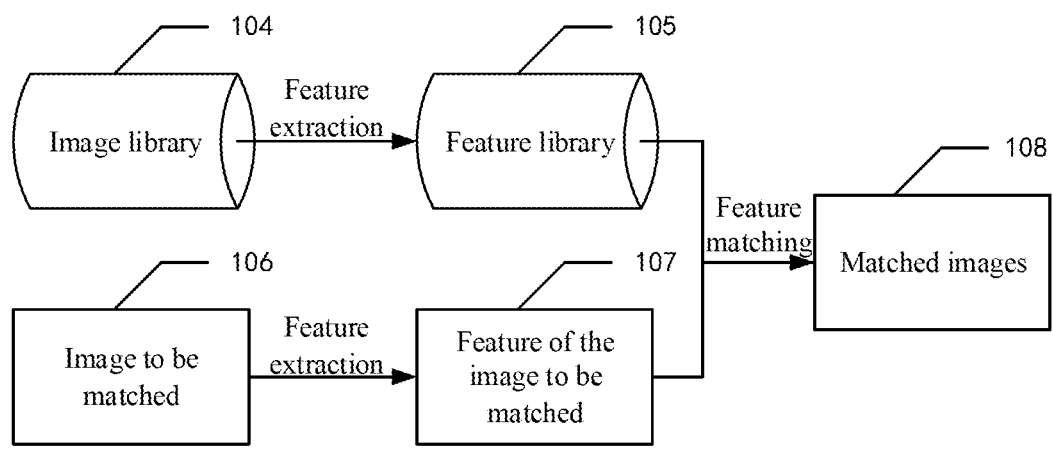

FIG. 1B exemplarily shows an implementation principle of the method of matching an image and the apparatus of matching an image according to the embodiments of the present disclosure. As shown in FIG. 1B, an image library 104 and a feature library 105 are deployed in the above system architecture. Exemplarily, features may be extracted from all images (for example, digitized paintings, calligraphy works, photos, etc.) in the image library 104 respectively and saved in the feature library 105 first. After an image 106 to be matched is acquired, feature extraction is performed on the image 106 to be matched to obtain a feature 107 of the image to be matched. The feature 107 of the image to be matched is matched with each feature in the feature library 105 to calculate a feature similarity between the feature 107 of the image to be matched and each feature in the feature library 105. The feature similarities are sorted, and an image corresponding to a feature whose feature similarity is higher than a preset value is used as an image 108 matching the image 106 to be matched, indicating that the image is the same or similar to the image 106 to be matched. Then, the maintenance personnel of the image library may manually review the above-mentioned filtered images to delete the repeated or substantially repeated images in the image library 104.

The technical solutions of the present disclosure and how the technical solutions of the present disclosure solve the above technical problems are described in detail below with specific embodiments. The following specific embodiments may be combined with each other, and the same or similar concepts or processes may not be repeated in some embodiments. The embodiments of the present disclosure will be described below in conjunction with the accompanying drawings.

Figure 2:
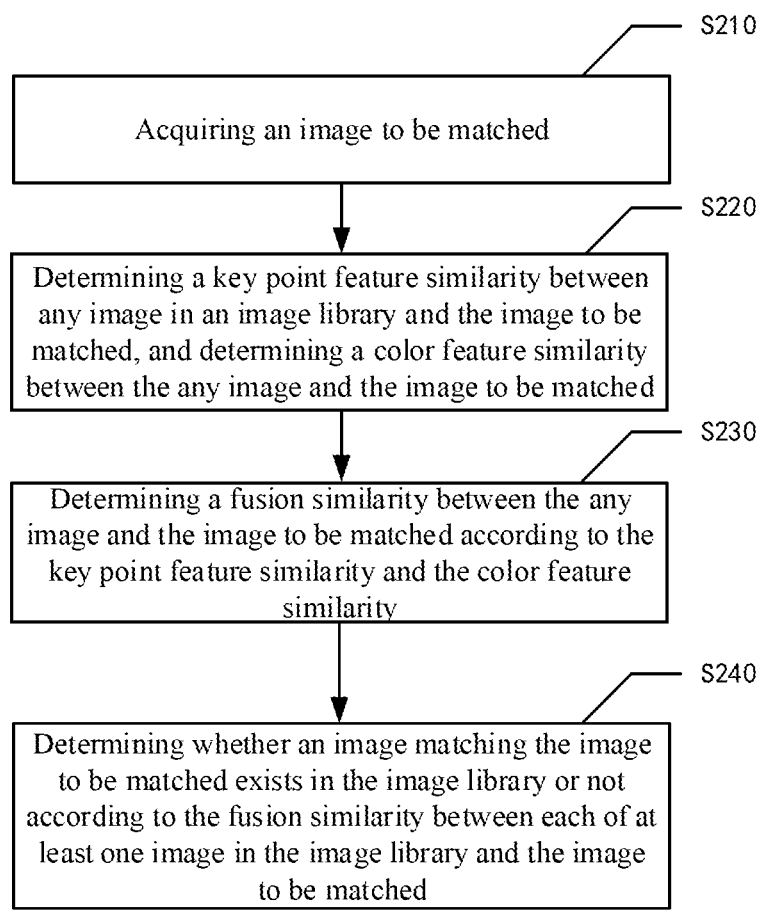
FIG. 2 is a schematic flowchart of a method of matching an image provided by an embodiment of the disclosure.

The embodiment of the present disclosure provides a method of matching an image. It should be noted that the sequence number of each step in the following method is only used to indicate the step for description, and should not be regarded as indicating the execution order of the various steps. Unless explicitly stated otherwise, the method need not be performed exactly in the order shown. The schematic flow chart of the method is shown in FIG. 2. For example, the method may include: steps S210 to S240.

Step S210: acquiring an image to be matched.

Step S220: determining a key point feature similarity between any image in an image library and the image to be matched, and determining a color feature similarity between the any image and the image to be matched.

Exemplarily, key points may include various extreme points in an image, such as corner points, edge points, bright points in dark areas, dark points in bright areas, and so on. The key point feature similarity between the any image and the image to be matched may include a similarity between a key point feature of the any image and a key point feature of the image to be matched. The color feature similarity between the any image and the image to be matched may include a similarity between a color feature of the any image and a color feature of the image to be matched. The color features of the image may be determined based on various color models of the image.

Step S230: determining a fusion similarity between the any image and the image to be matched according to the key point feature similarity and the color feature similarity.

Step S240: determining whether an image matching the image to be matched exists in the image library or not according to the fusion similarity between each of at least one image in the image library and the image to be matched.

Those skilled in the art may understand that in the method of matching an image according to the embodiment of the present disclosure, when matching the image to be matched, first determines the key point feature similarity and the color feature similarity between the any image in the image library and the image to be matched, and then determines the fusion similarity between the any image and the image to be matched based on the determined key point feature similarity and color feature similarity. Therefore, according to the fusion similarity between each image in the image library and the image to be matched, determining whether an image matching the image to be matched exists in the image library or not, and realizing a technical effect that searching for images (images in the image library) by images (images to be matched). As the fusion similarity composed of the key point feature similarity and the color feature similarity is selected for matching determination in the image matching process, the features of multiple dimensions in the image are comprehensively considered, which may effectively improve the matching accuracy. It may quickly and effectively find out the existing images in the image library that are the same or similar to the image to be matched, thereby avoiding the repeated addition of the same or similar images, and avoiding the waste of storage space.

Figure 3:
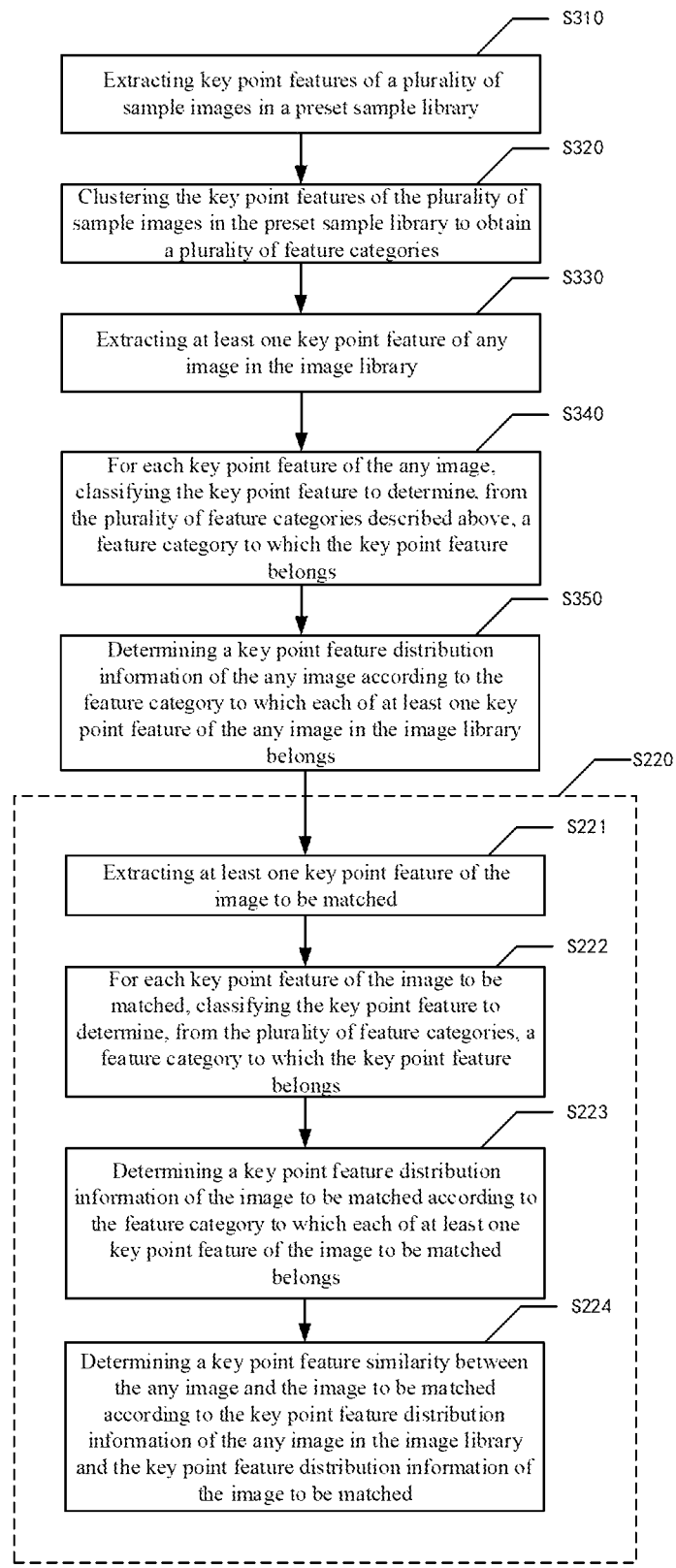
FIG. 3 is a schematic flowchart of a method of matching an image provided by another embodiment of the present disclosure.

FIG. 3 schematically shows an example flowchart of a method of matching an image provided by another embodiment of the present disclosure. Compared with the method of matching an image shown in FIG. 2, the method of matching an image shown in FIG. 3 may further include steps S310 to S350 before determining the key point feature similarity between the any image in the image library and the image to be matched in the above-mentioned step S220.

Step S310: extracting key point features of a plurality of sample images in a preset sample library.

Where the preset sample library is composed of a large number of sample images, and the preset sample library may include an image library.

Exemplarily, the aforementioned key point feature may be a SIFT (Scale-invariant feature transform) key point feature.

Step S320: clustering the key point features of the plurality of sample images in the preset sample library to obtain a plurality of feature categories.

Exemplarily, hierarchical clustering may be performed according to the SIFT feature of each sample image in the preset sample library. For example, HIKM (hierarchical clustering K-means, cluster center initialization method based on a hierarchical method) may be used for clustering to obtain a plurality of feature categories. In this example, each feature category may be referred to a HIKM category.

Step S330: extracting at least one key point feature of any image in the image library.

Step S340: for each key point feature of the any image, classifying the key point feature to determine, from the plurality of feature categories described above, a feature category to which the key point feature belongs.

Exemplarily, according to the obtained a plurality of HIKM categories, a HIKM classification is performed on the SIFT key point features of each image in the image library to obtain the HIKM category to which each SIFT key point feature in each image belongs.

Step S350: determining key point feature distribution information of the any image according to the feature category to which each of at least one key point feature of the any image in the image library belongs.

Figure 4:
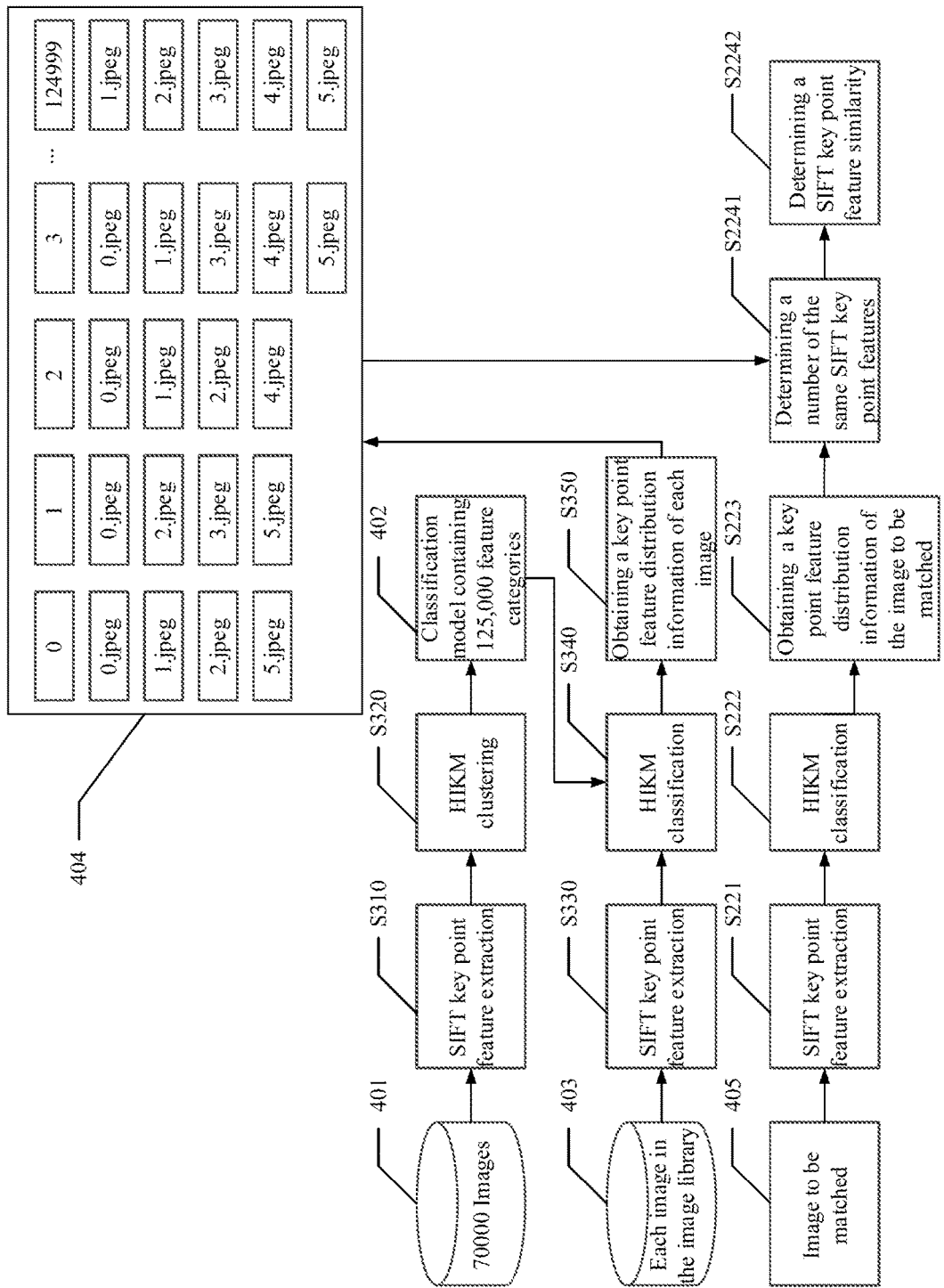
FIG. 4 is a schematic diagram of key point feature extraction and key point feature similarity calculation provided by an embodiment of the disclosure.

The process of determining key point feature distribution information of each image in the image library will be exemplified below with reference to FIG. 4. As shown in FIG. 4, for example, SIFT key point feature extraction is performed on 70,000 images in a preset sample library 401 (step S310) to obtain 60 million SIFT key points, that is, 60 million SIFT key point features. HIKM clustering is performed on the 60 million SIFT key point features (step S320), and a classification model 402 containing 125,000 feature categories (HIKM categories) is established.

Further, SIFT key point feature extraction is performed on each image in the image library 403 (step S330) to obtain M SIFT key points of each image, that is, M SIFT key point features, and M is a positive integer. According to the actual situation, the number of key point features contained in different images in the image library may be the same or different, and there is no restriction here. All the images in the image library may be a part of the images in the preset sample library, so that the clustering results for the key point features in the preset sample library may cover the classification results of the key point features in the image library. According to the classification model containing 125,000 feature categories established above, the HIKM classification is performed on the M SIFT key point features of each image respectively to determine the feature category to which the M SIFT key point features belong (step S340). For example, in M SIFT key point features, the feature category to which the first key point feature belongs is $C_1$, the feature category to which the second key point feature belongs is $C_2$, . . . , the feature category to which the $M^{th}$ key point feature belongs is CM. Feature categories $C_1$ to $C_M$ all belong to the 125,000 feature categories mentioned above, and the number of non-repetitive categories in feature categories $C_1$ to $C_M$ is Q, and Q is an integer greater than or equal to 1 and less than or equal to M. According to the feature categories $C_1$~$C_M$, the key point feature distribution information of each image may be obtained (step S350). For example, the key point feature distribution information may be indicated by an M-dimensional vector. If different feature categories are indicated by different integer data, the key point feature distribution information may be indicated as an M-dimensional integer. According to the embodiment of the present disclosure, a reverse index table 404 may also be established according to the key point feature distribution information of each image in the image library for subsequent matching, which will be described in detail below.

For example, there are 15,000 images in the image library. Where a SIFT key point feature extraction is performed on the $0^{th}$ image (0.jpeg) to obtain 4 SIFT key points, that is, 4 SIFT key point features. A HIKM classification is performed on each of the 4 SIFT key point features of the $0^{th}$ image, and a feature category to which each of the 4 SIFT key point features belongs is determined. For example, a feature category to which the first key point feature belongs is a first category (indicated by "0"), a feature category to which the second key point feature belongs is a second category (indicated by "1"), and a feature category to which the third key point feature belongs is a third category (indicated by "2"), and a feature category to which the fourth key point feature belongs is a fourth category (indicated by "3"), and a M-dimensional integer of the $0^{th}$ image is {0, 1, 2, 3}. Similarly, the M-dimensional integer of the first image (1.jpeg) is {0, 2, 3, 124999}, where "124999" indicates a $125000^{th}$ feature category. By analogy, the key point feature distribution information of each image in the image library may be determined.

According to an embodiment of the present disclosure, as shown in FIG. 3, the above-mentioned step S220 of determining a key point feature similarity between any image in the image library and the image to be matched may include the following steps.

Step S221: extracting at least one key point feature of the image to be matched.

Exemplarily, the extracted key point feature may be a SIFT key point feature, for example.

Step S222: for each key point feature of the image to be matched, classifying the key point feature to determine, from the plurality of feature categories, a feature category to which the key point feature belongs.

Step S223: determining key point feature distribution information of the image to be matched according to the feature category to which each of at least one key point feature of the image to be matched belongs.

The above steps S222 to S223 may be performed according to the above implementation manner of steps S340 to S350, and the repeated parts will not be repeated.

Continuing to refer to FIG. 4, for example, the SIFT feature is extracted from the image to be matched 405 (step S221) to obtain N SIFT key points, that is, N SIFT key point features, and N is a positive integer. The HIKM classification is performed on each of the N SIFT key point features to determine a feature category to which each of the N SIFT key point features belongs (step S222) by using the above-established classification model containing 125,000 feature categories. According to a feature category to which each of the N SIFT key point features belongs, key point feature distribution information of the image to be matched may be obtained (step S223). For example, the key point feature distribution information may be indicated by an N-dimensional vector. If different feature categories are indicated by different integer data, each SIFT key point feature in this example will be classified as an integer between 0 and 124999 after HIKM classification, then the key point feature distribution information of the image to be matched may be indicated as an N-dimensional integer.

Step S224: determining a key point feature similarity between the any image and the image to be matched according to the key point feature distribution information of the any image and the key point feature distribution information of the image to be matched.

Exemplarily, the above-mentioned step S224 of determining a key point feature similarity between the any image and the image to be matched according to the key point feature distribution information of the any image and the key point feature distribution information of the image to be matched may include: determining a first number of key point features contained in the any image and the image to be matched and belonging to same feature category according to the key point feature distribution information of the any image and the key point feature distribution information of the image to be matched, and determining a key point feature similarity between the any image and the image to be matched according to the first number.

Exemplarily, the above-mentioned step S224 of determining a key point feature similarity between the any image and the image to be matched according to the key point feature distribution information of the any image and the key point feature distribution information of the image to be matched may include: determining a first number of SIFT key points features contained in the any image and the image to be matched and belonging to the same feature category according to the key point feature distribution information of the any image in the image library and the key point feature distribution information of the image to be matched, and determining a key point feature similarity between the any image and the image to be matched. In a same way, a key point feature similarity between each image in the image library and the image to be matched may be determined.

In an example, a SIFT key point feature similarity between the image to be matched and the any image in the image library may be determined according to a following formula (1):

$$P_{sift} = \frac{N_{same}}{N_{check} + N_n} \quad \text{formula (1)}$$

In the formula (1), $P_{sift}$ indicates a SIFT key point feature similarity between the image to be matched and the any image in the image library, $N_{same}$ indicates a first number of SIFT key points features contained in the any image in the image library and the image to be matched and belonging to the same feature category (hereinafter may be referred to as a same key point feature contained in the image to be matched and the any image), $N_{check}$ indicates a total number of SIFT key point features contained in the image to be matched, $N_n$ indicates a total number of SIFT key point features contained in the any image in the image library.

According to an embodiment of the present disclosure, a process of determining a number of the same key point features contained in the image to be matched and each image in the image library may include: comparing the key point feature distribution information of the image to be matched with the key point feature distribution information of each image in the image library to determine key point features contained in each image and the image to be matched and belonging to the same feature category. Exemplarily, the N-dimensional integer of the image to be matched is compared with the N-dimensional integer of each image in the image library to determine a same feature category between the image to be matched and each image in the image library; according to a number of occurrences of the same feature category contained in the image to be matched and each image in the image library, determining a number of the same key point features between the image to be matched and each image in the image library.

In order to further improve the image matching efficiency, according to an embodiment of the present disclosure, after the key point feature distribution information of each image in the image library is determined, a reverse index table may be established based on the key point feature distribution information of each image. The reverse index table is used to indicate a mapping relationship from each of the plurality of feature categories obtained by clustering to at least one image in the image library. According to the key point feature distribution information of the image to be matched and the reverse index table, the key point feature similarity between the image to be matched and each image in the image library may be determined relatively quickly.

In an example shown in FIG. 4, 125,000 feature categories are obtained by clustering, and a reverse index table (feature library) 404 is established. The reverse index table contains 125,000 feature categories. For example, the numbers of the 125,000 feature categories in the reverse index table are integers ranging from 0 to 124999, respectively. After determining a M-dimensional integer of each image in the image library, each integer in the M-dimensional integer corresponds to one of the numbers of the 125,000 feature categories in the reverse index table. The image is added to corresponding feature category in the reverse index table according to the M-dimensional integer of each image. For example, an image 1.jpeg with a M-dimensional integer of {0, 2, 3, 124999} is added to feature categories numbered "0", "2", "3", and "124999" in the reverse index table, respectively, so that each feature category being numbered corresponds to one or more images in the image library. For example, a category numbered 0 corresponds to the images 0.jpeg, 1.jpeg, 2.jpeg, and 5.jpeg, which means that the images 0.jpeg, 1.jpeg, 2.jpeg, and 5.jpeg all have SIFT key point features attributable to the feature category numbered 0. The establishment of the reverse index table improves the speed of image matching and retrieval, and shortens the time of image matching and retrieval.

For example, as shown in FIG. 4, in step S2241, according to the key point feature distribution information (such as N-dimensional integer) of the image to be matched and the reverse index table, determining a number of the same SIFT key point features contained in the image to be matched and each image in the image library, and in step S2242, according to the number of same SIFT key point features contained in the image to be matched and each image in the image library, determining a SIFT key point feature similarity between the image to be matched and each image in the image library.

According to an embodiment of the present disclosure, based on the establishment of the reverse index table, the determining a first number of key point features contained in the any image in the image library and the image to be matched and belonging to the same feature category may include: setting an initial value of the first number of the same key point features contained in the any image in the image library and the image to be matched to 0. For each key point feature contained in the image to be matched, searching an image that has a mapping relationship with a feature category to which the key point feature belongs in the reverse index table, and when the images having a mapping relationship with a feature category to which the key point feature belongs comprising the any image, adding 1 to the value of the first number. And so on, in response to traverse all of the key point features contained in the image to be matched, determining a final value of the first number. The same is true for other images in the image library, which will not repeat here.

Continuing to refer to FIG. 4, for example, when performing image matching, assuming that there are 15,000 images in the image library, first create a 15,000-dimensional array to store the first number of the same SIFT key point features contained in each image and the image to be matched, where the initial value of the first number is set to 0. If 900 key point features are extracted from the image to be matched, retrieving feature categories to which the 900 key point features in the reverse index table belong, respectively. When an image in each feature category to be retrieved occurs once, adding 1 to a position corresponding to an image in the 15000-dimensional array described above. When feature categories to which the 900 key point features belong is queried, the 15,000-dimensional array saves a number $N_{same}$ of the same key point features contained in each image in the image library and the image to be matched. The above formula (1) may be used to calculate a SIFT key point feature similarity between each image in the image library and the image to be matched.

According to the method of matching an image of the embodiment of the present disclosure, the reverse index table is used to improve the matching retrieval time. For example, experiments show that the retrieval time for 15,000 images in the image library is only 0.6 ms (milliseconds).

Figure 5:
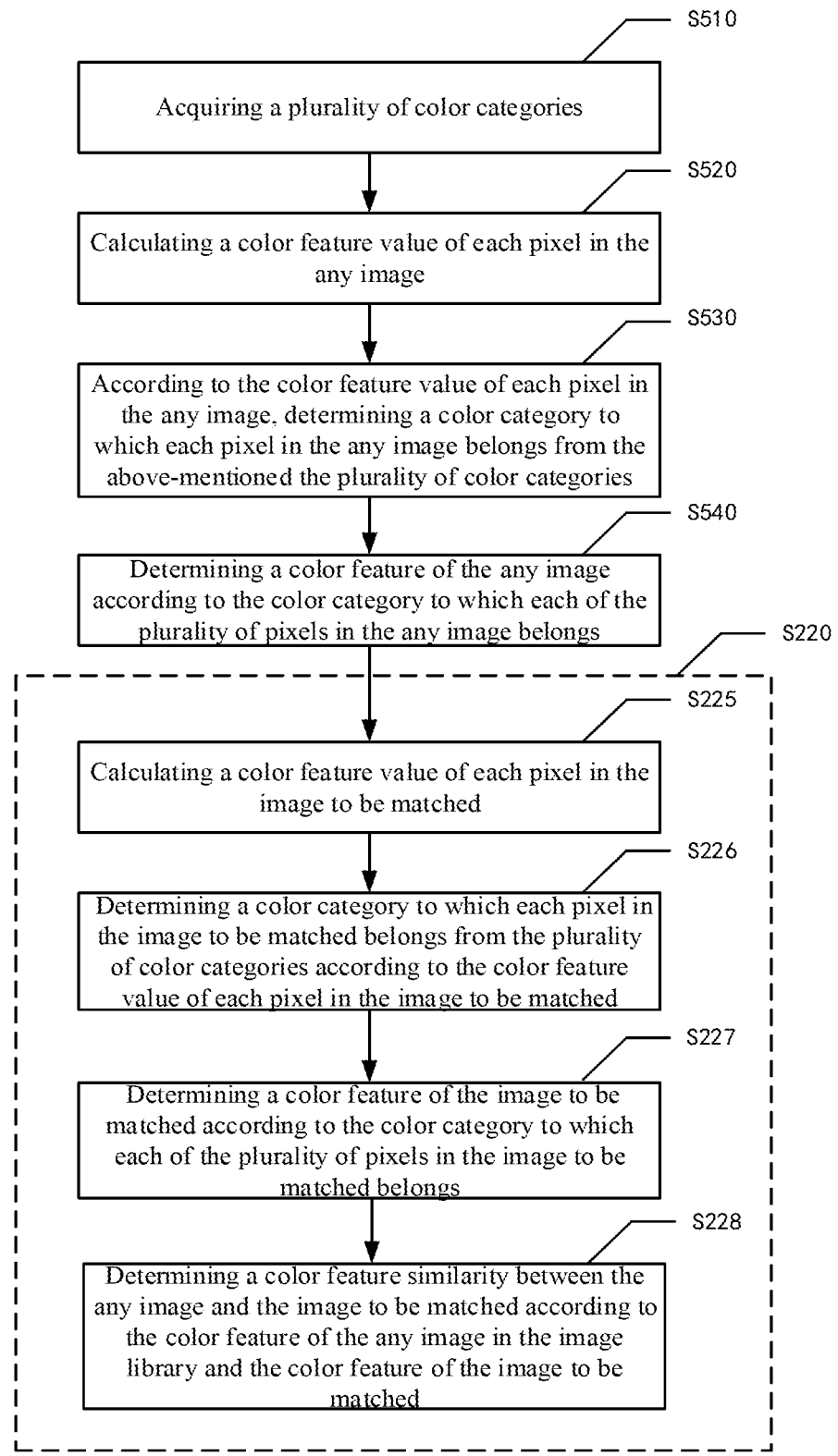
FIG. 5 is a schematic flowchart of a method of matching an image provided by another embodiment of the present disclosure.

FIG. 5 schematically shows an example flowchart of a method of matching an image provided by another embodiment of the present disclosure. Compared with the method of matching an image shown in FIG. 2, before the determining a color feature similarity between the any image in the image library and the image to be matched in above-mentioned step S220, the method of matching an image shown in FIG. 5 may further include steps S510 to S540.

Step S510: acquiring a plurality of color categories.

Step S520: calculating a color feature value of each pixel in the any image.

For example, the above process of the calculating a color feature value of each pixel in the any image may include: for each pixel in the any image, converting a color mode RGB (Red, Green, Blue) value of each pixel into an HSV (Hue, Saturation, Value) value, performing an integer processing on the HSV value, and calculating a color feature value of each pixel in the any image according to integer processed HSV value.

Step S530: according to the color feature value of each pixel in the any image, determining a color category to which each pixel in the any image belongs from the above-mentioned the plurality of color categories.

Step S540: determining a color feature of the any image according to the color category to which each of the plurality of pixels in the any image belongs.

According to an embodiment of the present disclosure, after the determining a color feature of each image in the image library, as shown in FIG. 5, the determining a color feature similarity between the any image and the image to be matched in the above-mentioned step S220 may include the following steps.

Step S225: calculating a color feature value of each pixel in the image to be matched.

For example, the calculating a color feature value of each pixel in the image to be matched described above includes: for each pixel in the image to be matched, converting a color mode RGB value of each pixel into an HSV value, performing an integer processing on the HSV value, and determining a color feature value of each pixel in the image to be matched according to integer processed HSV value.

Step S226: determining a color category to which each pixel in the image to be matched belongs from the plurality of color categories according to the color feature value of each pixel in the image to be matched.

Step S227: determining a color feature of the image to be matched according to the color category to which each of the plurality of pixels in the image to be matched belongs.

Step S228: determining a color feature similarity between the any image and the image to be matched according to the color feature of the any image in the image library and the color feature of the image to be matched.

According to an embodiment of the present disclosure, the determining a color feature similarity between each image in the image library and the image to be matched according to the color feature of the image to be matched and the color feature of each image in the image library in the above-mentioned step S228 may include: determining an Euclidean distance between the color feature of the any image in the image library and the color feature of the image to be matched; and determining a color feature similarity between the any image and the image to be matched according to the Euclidean distance.

Figure 6:
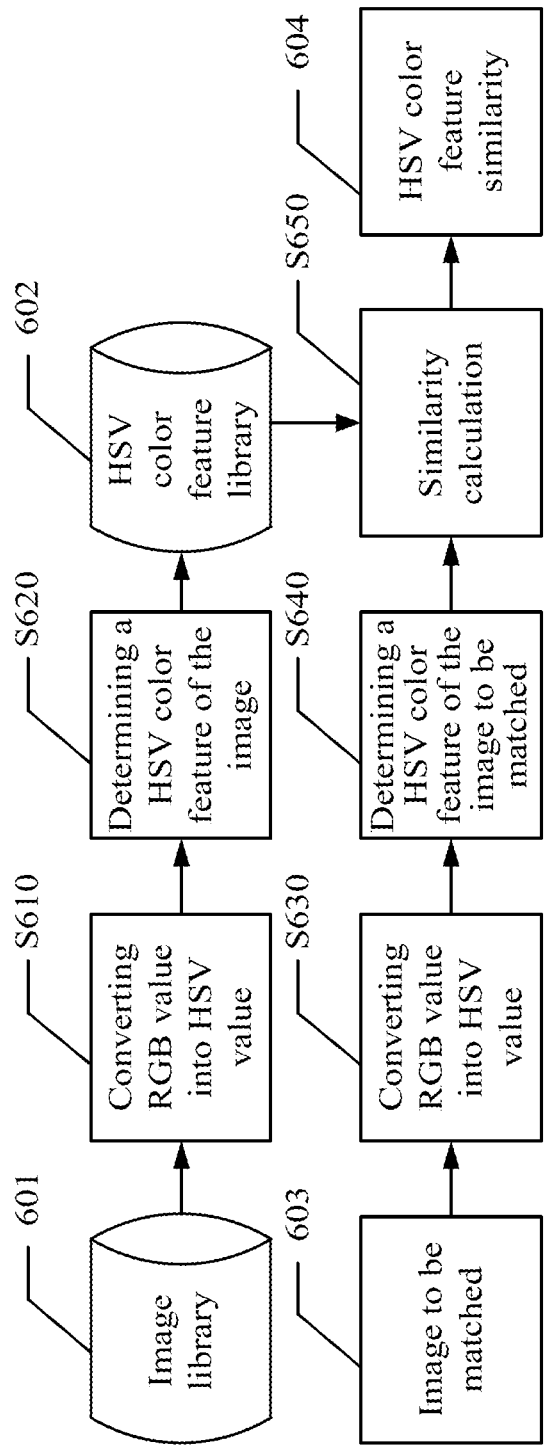
FIG. 6 is a schematic diagram of color feature extraction and color feature similarity calculation provided by an embodiment of the disclosure.

The process of determining a color feature similarity between each image in the image library and the image to be matched is exemplarily described below with reference to FIG. 6. Optionally, as shown in FIG. 6, in step S610, converting a RGB value of each pixel in each image in the image library 601 into an HSV value, and then in step S620, determining a HSV color feature of the image according to the HSV value of each pixel in each image. The HSV color feature of at least one image in the image library may establish a HSV color feature library 602. In step S630, converting a RGB value of the image to be matched 603 into an HSV value, and then in step S640, determining a HSV color feature of the image to be matched according to the HSV value of each pixel in the image to be matched. In step S650, a similarity calculation is performed according to the HSV color feature of the image to be matched and the HSV color feature of each image in the HSV feature library to obtain a HSV color feature similarity 604 between each image in the image library and the image to be matched.

According to an embodiment of the present disclosure, for images with simple textures (such as paintings), colors in the image is the most direct and important feature for distinguishing images, and the HSV color feature in the color feature is a feature close to the perception of the human eye. In an embodiment of the present disclosure, calculating the color feature similarity according to the HSV color feature may more accurately reflect the similarity of the color distribution between the images. The calculation formulas for converting the RGB value into the HSV value are as follows:

$$V = \frac{1}{\sqrt{3}}[R + G + B] \qquad \text{formula (2)}$$

$$S = 1 - \frac{\sqrt{3}}{V}\min(R, G, B) \qquad \text{formula (3)}$$

$$H = \begin{cases} \theta & G \geq B \\ 2\pi - \theta & G < B \end{cases} \qquad \text{formula (4)}$$

Where $$\theta = \left(\cos\left[\frac{1/2[(R-G)+(R-B)]}{\sqrt{(R-G)^2 + (R-B)(G-B)}}\right]\right)^{-1},$$

R, G, and B are a red coordinate value, a green coordinate value, and a blue coordinate value of a color, respectively, and the coordinate values are real numbers between 0 and 1.

After obtaining the HSV value by using the RGB value, performing an integer processing on the HSV value. For example, a H space may be divided into 8 parts, a S space may be divided into 3 parts, and a V space may be divided into 3 parts, where:

$$H = \begin{cases} 0H \in [0, 20] \\ 1H \in [21, 40] \\ 2H \in [41, 75] \\ 3H \in [76, 155] \\ 4H \in [156, 190] \\ 5H \in [191, 270] \\ 6H \in [271, 295] \\ 7H \in [296, 360] \end{cases}$$

$$S = \begin{cases} 0S \in [0, 0.2] \\ 1S \in [0.2, 0.7] \\ 2S \in [0.7, 1] \end{cases}$$

$$V = \begin{cases} 0V \in [0, 0.2] \\ 1V \in [0.2, 0.7] \\ 2V \in [0.7, 1] \end{cases}$$

The HSV color feature value of each pixel is $Z=9H+3S+V$, $G \in [0,1, \ldots 71]$. In this embodiment, Z has 72 value spaces in total, and the 72 value spaces may correspond to the above-mentioned plurality of color categories, that is, 72 color categories are obtained. After determining the HSV color feature value of each pixel in an image, determining a color category to which each pixel belongs in 72 color categories. For example, when a color feature value of a pixel is 5, determining that the pixel belongs to the fifth color category. It may be determined that in an image: a number of pixels belonging to the first color category is $W_1$, a number of pixels belonging to the second color category is $W_2, \ldots$, a number of pixels belonging to the $72^{th}$ color category is $W_{72}$. Assuming that a total number of pixels in the image is W, the HSV color feature of the image may be: $\{W_1/W, W_2/W, W_{72}/W\}$. The HSV color feature similarity $P_{color}$ may use the normalized Euclidean distance calculation formula as shown below:

$$P_{color} = \frac{1}{1 + dist(Z_i - Z_{check})} \qquad \text{formula (5)}$$

Where $Z_i$ indicates a HSV color feature of the $i^{th}$ image in the image library, and $Z_{check}$ indicates a HSV color feature of the image to be matched.

It may be understood that the foregoing embodiments determine the scale-invariant feature transform SIFT key point feature similarity and the color model HSV color feature similarity between each image in the image library and the image to be matched according to features of the image to be matched and features of each image in the image library.

Next, the SIFT key point feature similarity and HSV color feature similarity between the image to be matched and each image in the image library are fused to obtain a fusion similarity between the image to be matched and each image in the image library.

Exemplarily, according to a product of the key point feature similarity between the image to be matched and the any image in the image library and a first weight, and a product of the color feature similarity between the image to be matched and the any image and a second weight, a fusion similarity between the image to be matched and each image in the image library is determined. A sum of the first weight and the second weight is 1.

For example, the first weight may be determined by a following formula (6):

$$\alpha = \frac{N_{check} - L_1}{L_2 - L_1} \quad \text{formula (6)}$$

In the formula (6), $\alpha$ indicates a first weight, $N_{check}$ indicates a number of key point features of the image to be matched, $L_1$ indicates a first threshold number of key point features, and $L_2$ indicates a second threshold number of key point features.

According to an embodiment of the present disclosure, after determining the key point feature similarity and color feature similarity between each image in the image library and the image to be matched, the key point feature similarity and the color feature similarity are fused to obtain the fusion similarity, and a calculation formula of the fusion similarity is as follows:

$$P_{final} = \alpha P_{sift} + \beta P_{color} \quad \text{formula (7)}$$

In the formula (7), $\alpha + \beta = 1$, $\alpha$ and $\beta$ are the first weight and the second weight of the two similarities in the fusion similarity, respectively.

Color feature may solve a problem of low accuracy of image retrieval with simple texture in a searching process, and the complexity of texture is characterized by the number of key point features. In the image library, after statistics, for example, for an image (painting) with a size of 640*360, a number of key points extracted from an image with a complex texture will be more than 600, while a number of key points for an image with a simple texture will be less than 400. For images with simple textures, that is, when $N_{check} < 400$, the key point feature has less effect on image matching, and $\alpha = 0$ may be set at this time. For images with complex textures, that is, when $N_{check} > 600$, the key point feature has a greater effect on image matching, while the color feature has less effect on image matching, and $\alpha = 1$ may be set at this time. When $400 < N_{check} < 600$, the larger $N_{check}$, the larger $\alpha$. When $L_1$ is 400 and $L_2$ is 600, the calculation formula (6) of $\alpha$ is shown in a following formula (8):

$$\alpha = \frac{N_{check} - 400}{600 - 400} = \frac{N_{check} - 400}{200} \quad \text{formula (8)}$$

$\alpha$ makes $P_{final}$ both efficient and high accuracy for the retrieval of images with simple textures, and may be adaptively adjusted between images with complex textures and images with simple textures, so as to make the $P_{final}$ adaptable and expand the scope of application and application scenarios.

According to an embodiment of the present disclosure, according to the fusion similarity between the image to be matched and each image in the image library, it may be determined whether an image matching the image to be matched exists in the image library or not.

For example, fusion similarities between each of at least one image in the image library and the image to be matched may be sorted in descending order to obtain a fusion similarity sequence. And compared with the fusion similarity threshold, if a fusion similarity greater than the fusion similarity threshold exists in the fusion similarity sequence, it is determined that an image matching the image to be matched exists in the image library. Specifically, the image for which the fusion similarity is greater than the fusion similarity threshold is used as the image matching the image to be matched. Further, when no image matching the image to be matched exists in the image library, the image to be matched may be stored in the image library. When a plurality of images matching the image to be matched existing in the image library, the duplicate images in the image library may be deleted.

By applying the embodiments of the present disclosure, at least the following beneficial effects may be achieved:

1) acquiring the features of the image to be matched. According to the features of the image to be matched and the features of each image in the image library, the scale-invariant feature transform SIFT key point feature similarity and the color model HSV color feature similarity between each image in the image library and the image to be matched are determined. The SIFT key point feature similarity and the HSV color feature similarity between the image to be matched and each image in the image library are fused to obtain the fusion similarity between the image to be matched and each image in the image library. According to the fusion similarity between the image to be matched and each image in the image library, it is determined whether an image that is duplicated with the image to be matched exists in the image library or not. In this way, by fusing the SIFT key point feature similarity and the HSV color feature similarity between each image in the image library and the image to be matched, the accuracy and efficiency of image matching are improved, which is conducive to find out duplicate or roughly duplicate images more accurately and quickly, and delete them, thereby saving image storage space and reducing the waste of image storage resources;

2) improving the matching accuracy of simple texture images, thereby reducing the waste of image storage resources; and 3) the establishment of the reverse index table improving the image matching retrieval speed and shortens the image matching retrieval time.

Figure 7:
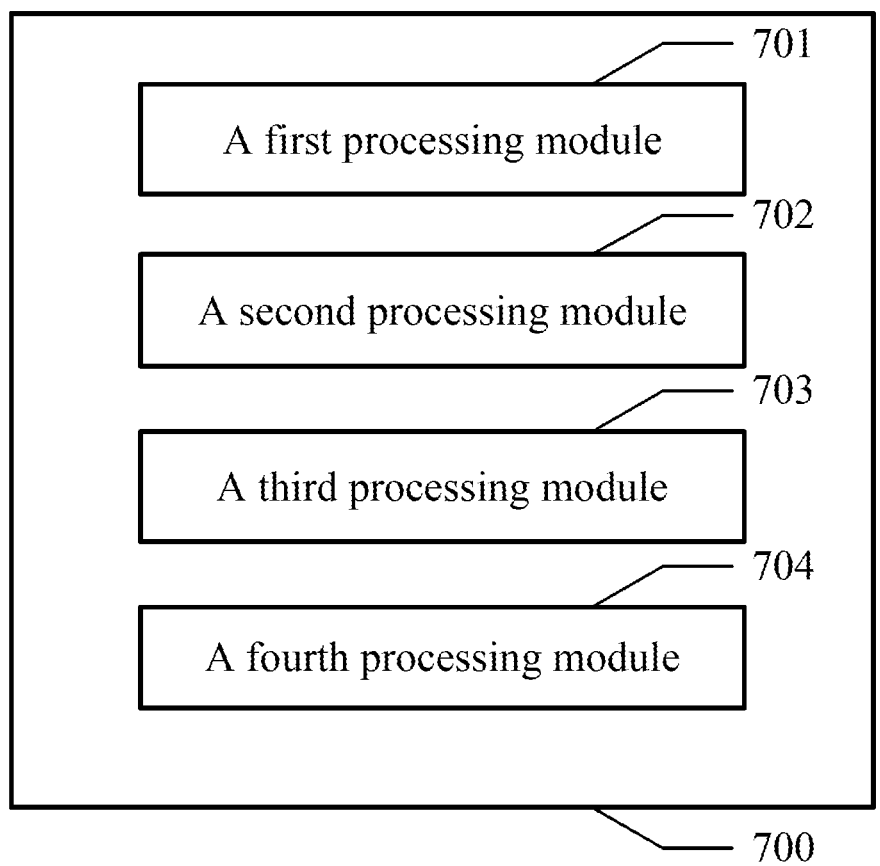
FIG. 7 is a schematic structural diagram of an apparatus of matching an image provided by an embodiment of the disclosure.

Based on the same concept, the embodiments of the present disclosure also provide an apparatus of matching an image. The structure diagram of the apparatus of matching an image is shown in FIG. 7. The apparatus 700 of matching an image includes a first processing module 701, a second processing module 702, and a third processing module 703, and a fourth processing module 704.

The first processing module 701 is configured to acquire an image to be matched. The second processing module 702 is configured to determine a key point feature similarity between any image in an image library and the image to be matched, and determine a color feature similarity between the any image and the image to be matched. The third processing module 703 is configured to determine a fusion similarity between the any image and the image to be matched according to the key point feature similarity and the color feature similarity. The fourth processing module 704 is configured to determine whether an image matching the image to be matched exists in the image library or not according to the fusion similarity between each of at least one image in the image library and the image to be matched. For content that is not described in detail in the apparatus of matching an image provided by an embodiment of the present disclosure, please refer to the above-mentioned method of matching an image. The apparatus of matching an image provided by an embodiment of the present disclosure may achieve the same beneficial effects as the above-mentioned method of matching an image, and will not be repeated here.

Figure 8:
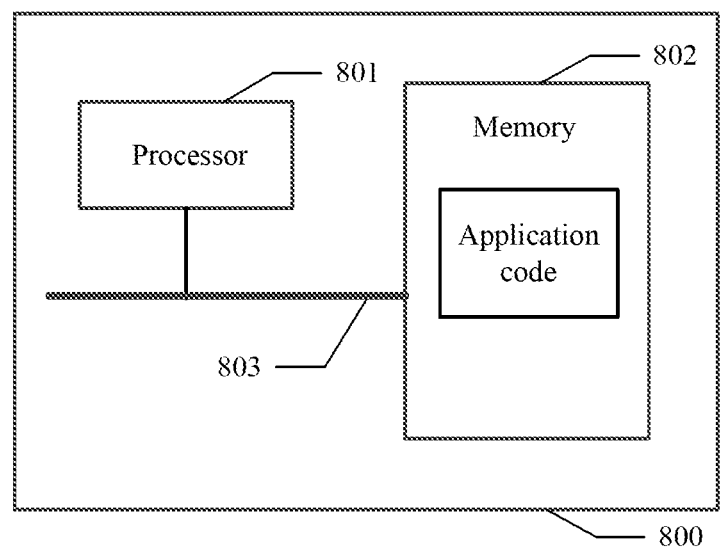
FIG. 8 is a schematic structural diagram of an electronic device provided by an embodiment of the disclosure.

Based on the same concept, the embodiments of the present disclosure also provide an electronic device. The structural diagram of the electronic device is shown in FIG. 8. The electronic device 800 includes at least one processor 801, a memory 802, and a bus 803. The at least one processor 801 are all electrically connected to the memory 802; the memory 802 is configured to store at least one computer-executable instruction, and the processor 801 is configured to execute the at least one computer-executable instruction, so as to execute the steps of any method of matching an image provided in any embodiment or any optional implementation in the embodiments of the present disclosure.

Further, the processor 803 may be an FPGA (Field-Programmable Gate Array) or other devices with logic processing capabilities, such as MCU (Microcontroller Unit), CPU (Central Process Unit).

Based on the same concept, embodiments of the present disclosure provide a computer-readable storage medium on which a computer program is stored, and when the computer program is executed by a processor, the method of matching an image provided in the embodiments of the present disclosure is implemented.

The computer-readable storage medium may include, but not limited to, any type of disk (including floppy disk, hard disk, CD-ROM, CD-ROM, and magneto-optical disk), ROM, RAM, EPROM (Erasable Programmable Read-Only Memory), EEPROM, flash memory, magnetic card or light card. That is, the readable medium includes any medium that stores or transmits information in a readable form by a device (for example, a computer).

The computer-readable storage medium provided in this embodiment has the same inventive concept and the same beneficial effects as the foregoing embodiments, and will not be repeated here.

Those skilled in the art may understand that the various operations, methods, steps, measures, and solutions in the process that have been discussed in this disclosure may be alternated, changed, combined, or deleted. Further, various operations, methods, and other steps, measures, and solutions in the process that have been discussed in this disclosure may also be alternated, changed, rearranged, decomposed, combined, or deleted. Further, the various operations, methods, steps, measures, and solutions in the process in the related art that are disclosed in the present disclosure may also be alternated, changed, rearranged, decomposed, combined, or deleted.

It should be understood that although the various steps in the flowchart of the drawings are displayed in sequence as indicated by the arrows, these steps are not necessarily performed in sequence in the order indicated by the arrows. Unless explicitly stated in the present disclosure, there is no strict order for the execution of these steps, and they may be executed in other orders. Moreover, at least part of the steps in the flowchart of the drawings may include multiple sub-steps or multiple stages. These sub-steps or stages are not necessarily executed at the same time, but may be executed at different times, and the order of execution is also not necessarily performed sequentially, but may be performed in sequence or alternately with at least a part of other steps or sub-steps of other steps or stages.

The above are only part of the embodiments of the present disclosure. It should be pointed out that for those of ordinary skill in the art, without departing from the principles of the present disclosure, several improvements and modifications may be made, and these improvements and modifications may be regarded as the protection scope of this disclosure.

What is claimed is:

1. A method of matching image, comprising:
   acquiring an image to be matched;
   determining a key point feature similarity between any image in an image library and the image to be matched, and determining a color feature similarity between the any image and the image to be matched;
   determining a fusion similarity between the any image and the image to be matched according to the key point feature similarity and the color feature similarity; and
   determining whether an image matching the image to be matched exists in the image library or not according to the fusion similarity between each of at least one image in the image library and the image to be matched.

2. The method according to claim 1, further comprising: prior to the determining a key point feature similarity between any image in an image library and the image to be matched,
   extracting key point features of a plurality of sample images in a preset sample library, and the preset sample library comprising the image library;
   clustering the key point features of the plurality of sample images to obtain a plurality of feature categories;
   extracting at least one key point feature of the any image;
   for each key point feature of the any image, classifying the key point feature to determine, from the plurality of feature categories, a feature category to which the key point feature belongs; and
   determining key point feature distribution information of the any image according to the feature category to which each of at least one key point feature of the any image belongs.

3. The method according to claim 2, wherein the determining a key point feature similarity between the any image and the image to be matched comprises:
   extracting at least one key point feature of the image to be matched;
   for each key point feature of the image to be matched, classifying the key point feature to determine, from the plurality of feature categories, a feature category to which the key point feature belongs;
   determining key point feature distribution information of the image to be matched according to the feature category to which each of at least one key point feature of the image to be matched belongs; and
   determining a key point feature similarity between the any image and the image to be matched according to the key point feature distribution information of the any image and the key point feature distribution information of the image to be matched.

4. The method according to claim 3, wherein the determining a key point feature similarity between the any image and the image to be matched according to the key point feature distribution information of the any image and the key point feature distribution information of the image to be matched comprises:
   determining a first number of key point features contained in the any image and the image to be matched and belonging to same feature category according to the key point feature distribution information of the any image and the key point feature distribution information of the image to be matched; and
   determining a key point feature similarity between the any image and the image to be matched according to the first number.

5. The method according to claim 4, wherein the first number is $N_{same}$, the any image comprises a second number $N_n$ key point features, and the image to be matched comprises a third number $N_{check}$ key point features, wherein $N_{same}$, $N_n$, and $N_{check}$ are all integers greater than or equal to 0;
   the determining a key point feature similarity between the any image and the image to be matched according to the first number comprises: determining a key point feature similarity between the any image and the image to be matched according to a following formula $P_{sift}$:

$$P_{sift} = \frac{N_{same}}{N_{check} + N_n}.$$

6. The method according to claim 5, further comprising:
   prior to the determining a key point feature similarity between the any image and the image to be matched, determining a reverse index table according to the key point feature distribution information of each of at least one image in the image library, and the reverse index table indicating a mapping relationship from each of the plurality of feature categories to the at least one image;
   wherein the determining a first number of key point features contained in the any image and the image to be matched and belonging to same feature category comprises:
   setting an initial value of the first number to 0;
   for each key point feature contained in the image to be matched, searching an image that has a mapping relationship with a feature category to which the key point feature belongs in the reverse index table, and when the image having a mapping relationship comprising the any image, adding 1 to the value of the first number; and
   in response to traverse the key point features contained in the image to be matched, determining the value of the first number.

7. The method according to claim 4, further comprising:
   prior to the determining a key point feature similarity between the any image and the image to be matched, determining a reverse index table according to the key point feature distribution information of each of at least one image in the image library, and the reverse index table indicating a mapping relationship from each of the plurality of feature categories to the at least one image;
   wherein the determining a first number of key point features contained in the any image and the image to be matched and belonging to same feature category comprises:
   setting an initial value of the first number to 0;
   for each key point feature contained in the image to be matched, searching an image that has a mapping relationship with a feature category to which the key point feature belongs in the reverse index table, and when the image having a mapping relationship comprising the any image, adding 1 to the value of the first number; and
   in response to traverse the key point features contained in the image to be matched, determining the value of the first number.

8. The method according to claim 1, wherein the key point feature comprises: a scale invariant feature transform SIFT key point feature.

9. The method according to claim 1, further comprising:
   prior to the determining a color feature similarity between the any image and the image to be matched,
   acquiring a plurality of color categories;
   calculating a color feature value of each pixel in the any image;
   determining a color category to which each pixel in the any image belongs from the plurality of color categories according to the color feature value of each pixel in the any image; and
   determining a color feature of the any image according to the color category to which each of a plurality of pixels in the any image belongs.

10. The method according to claim 9, wherein the determining a color feature similarity between the any image and the image to be matched comprises:
    calculating a color feature value of each pixel in the image to be matched;
    determining a color category to which each pixel in the image to be matched belongs from the plurality of color categories according to the color feature value of each pixel in the image to be matched; and
    determining a color feature of the image to be matched according to the color category to which each of the plurality of pixels in the image to be matched belongs.

11. The method according to claim 10, wherein the determining a color feature similarity between the any image and the image to be matched further comprises:
    determining an Euclidean distance between the color feature of the any image and the color feature of the image to be matched; and
    determining a color feature similarity between the any image and the image to be matched according to the Euclidean distance.

12. The method according to claim 11, wherein:
    the calculating a color feature value of each pixel in the any image comprises:
    for each pixel in the any image, converting a color mode RGB value of each pixel into an HSV value, performing an integer processing on the HSV value, and calculating a color feature value of each pixel in the any image according to integer processed HSV value; and
    wherein the calculating a color feature value of each pixel in the image to be matched comprises:
    for each pixel in the image to be matched, converting a color mode RGB value of each pixel into an HSV value, performing an integer processing on the HSV value, and determining a color feature value of each pixel in the image to be matched according to integer processed HSV value.

13. The method according to claim 10, wherein:
the calculating a color feature value of each pixel in the any image comprises:
for each pixel in the any image, converting a color mode RGB value of each pixel into an HSV value, performing an integer processing on the HSV value, and calculating a color feature value of each pixel in the any image according to integer processed HSV value; and
wherein the calculating a color feature value of each pixel in the image to be matched comprises:
for each pixel in the image to be matched, converting a color mode RGB value of each pixel into an HSV value, performing an integer processing on the HSV value, and determining a color feature value of each pixel in the image to be matched according to integer processed HSV value.

14. The method according to claim 1, wherein the determining a fusion similarity between the any image and the image to be matched according to the key point feature similarity and the color feature similarity comprises:
setting a first weight and a second weight, wherein a sum of the first weight and the second weight equals to 1;
performing a weighted summation on the key point feature similarity between the any image and the image to be matched and the color feature similarity between the any image and the image to be matched according to the first weight and the second weight to obtain a fusion similarity between the any image and the image to be matched.

15. The method according to claim 14, wherein the setting a first weight comprises: determining the first weight a by a following formula:

$$\alpha = \frac{N_{check} - M}{L - M}$$

wherein $N_{check}$ indicates a number of key point features of the image to be matched, M indicates a first threshold number of key point features, and L indicates a second threshold number of key point features, and M is not equal to L.

16. The method according to claim 1, wherein the determining whether an image matching the image to be matched exists in the image library or not according to the fusion similarity between each of at least one image in the image library and the image to be matched comprises:
sorting fusion similarities between each of at least one image in the image library and the image to be matched in descending order to obtain a fusion similarity sequence;
using an image for which a fusion similarity greater than a fusion similarity threshold in the fusion similarity sequence as an image matching the image to be matched.

17. An electronic device, comprising: at least one processor and a memory;
wherein the memory is configured to store a computer program; and
the processor is configured to execute the method according to claim 1 by calling the computer program.

18. A computer non-transitory readable storage medium having a computer program stored thereon, wherein the computer program is configured to implement the method according to claim 1 when executed by a processor.

* * * * *